US009312053B2

(12) United States Patent
Hinrichsen et al.

(10) Patent No.: US 9,312,053 B2
(45) Date of Patent: Apr. 12, 2016

(54) COMPOSITE INSULATOR

(75) Inventors: Volker Hinrichsen, Darmstadt (DE); Jens Seifert, Wunsiedel (DE)

(73) Assignee: Lapp Insulators GmbH, Wunsiedel (DE)

( * ) Notice: Subject to any disclaimer, the term of this patent is extended or adjusted under 35 U.S.C. 154(b) by 0 days.

(21) Appl. No.: 13/695,718

(22) PCT Filed: May 27, 2011

(86) PCT No.: PCT/EP2011/002627
§ 371 (c)(1), (2), (4) Date: Jan. 10, 2013

(87) PCT Pub. No.: WO2011/147583
PCT Pub. Date: Dec. 1, 2011

(65) Prior Publication Data

US 2013/0101846 A1 Apr. 25, 2013

(30) Foreign Application Priority Data

May 28, 2010 (DE) ........................ 10 2010 021 882

(51) Int. Cl.
*H01B 17/42* (2006.01)
*B32B 17/02* (2006.01)
(Continued)

(52) U.S. Cl.
CPC .............. *H01B 17/325* (2013.01); *H01B 17/42* (2013.01); *Y10T 428/2933* (2015.01); *Y10T 428/2958* (2015.01)

(58) Field of Classification Search
CPC .............. B32B 1/00; B32B 1/08; B32B 3/02; B32B 3/08; B32B 3/085; B32B 17/02; B32B 17/04; H01B 17/32; H01B 17/325; H01B 17/42–17/48
USPC ................ 428/375, 379–384, 388–390, 402; 174/73.1, 118, 178–179, 138 C, 138 R, 174/158 R–158 F, 211, 212
See application file for complete search history.

(56) References Cited

U.S. PATENT DOCUMENTS 3,066,180 A 11/1962 Virsberg et al.
4,563,544 A 1/1986 Bui et al.
(Continued)

FOREIGN PATENT DOCUMENTS

CA 2715651 A1 * 8/2009
DE 32 14 141 A1 10/1983
(Continued)

OTHER PUBLICATIONS

Weida, D., "Effects of microvaristor material on the occurrence of partial discharges upon insulators in rain test," Power Modulator and High Voltage Conference (IPMHVC), 2010 IEEE International, vol., no., pp. 497,500, 23-27 May 201.*
(Continued)

*Primary Examiner* — Jennifer Chriss
*Assistant Examiner* — Frank Vineis
(74) *Attorney, Agent, or Firm* — Mendelsohn Dunleavy, P.C.; Steve Mendelsohn

(57) ABSTRACT

Disclosed is a composite insulator (1) having a core (2), in particular made of a fiber-reinforced duromer, and a protective layer (8) which surrounds the core (2) and is made in particular of an insulating elastomer. In some sections, especially on the bottom side of screens (4), the protective layer (8) specifically includes particles (7) that influence the field of the insulator (1).

14 Claims, 6 Drawing Sheets

(51) Int. Cl.

| | |
|---|---|
| ***B32B 17/04*** | (2006.01) |
| ***B32B 18/00*** | (2006.01) |
| ***H01B 17/32*** | (2006.01) |

(56) References Cited

U.S. PATENT DOCUMENTS

| | | | | |
|---|---|---|---|---|
| 6,864,432 | B2 * | 3/2005 | Boettcher et al. .......... | 174/138 F |
| 8,637,769 | B2 * | 1/2014 | Denndoerfer et al. ....... | 174/73.1 |
| 2005/0067185 | A1 * | 3/2005 | Schomer et al. .............. | 174/142 |

FOREIGN PATENT DOCUMENTS

| | | | |
|---|---|---|---|
| GB | 1 334 164 | | 10/1973 |
| KR | 1020050045771 | A | 5/2005 |
| WO | WO2006136040 | A1 | 12/2006 |
| WO | WO 2009100904 | A1 | 8/2009 |

OTHER PUBLICATIONS

Mazur, D., "3D Vibration and Stress Analysis of Insulators", Renewable Energy and Power Quality Journal, No. 1, Apr. 2003, Paper 370.*

Vlastos, Antonios E.; Sherif, E., "Experience from insulators with RTV silicon rubber sheds and shed coatings," Power Delivery, IEEE Transactions on , vol. 5, No. 4, pp. 2030,2038, Oct. 1990 doi: 10.1109/61.103698.*

Kontargyri, Simulation of the Electric Field on Composite Insulators Using the Finite Elements Method, WSEAS Transactions on Circuits and Systems, Issue 5, vol. 4, Jul. 2004.*

International Search Report; Mailed Jan. 25, 2012 for corresponding PCT Application No. PCT/EP2011/002627.

English Translation of the International Search Report; Mailed Dec. 13, 2012 for corresponding PCT Application No. PCT/EP2011/002627.

* cited by examiner

COMPOSITE INSULATOR

FIELD

The invention relates to a composite insulator according to the preamble of patent claim 1. Such a composite insulator comprises a weight-bearing core, which is produced in particular from a fiber-reinforced thermoset, such as an epoxy resin or a vinyl ester. To provide the desired insulating properties and protection from external influences, in particular caused by the weather, the core is surrounded by a protective layer, which is produced in particular from an electrically insulating elastomer such as a silicone rubber.

BACKGROUND

When insulating high electrical voltages, the avoidance of partial discharges is always a necessity. Such discharges, resulting for example from local increases in the electric field, lead to instances of damage in the protective layer, in particular in the case of composite insulators, as a result of which the service life is reduced. In the case of composite insulators, measures to avoid local increases in the electric field are accordingly of great significance. Known for example as a suitable measure for high-voltage insulators are shielding electrodes, which are attached to the voltage-carrying fittings and help to avoid increases in the electric field there, at the ends of the fittings.

A great problem of high-voltage insulators in this respect is the extremely inhomogeneous distribution of the variation in voltage along their length. A reason for this is stray capacitances of the insulator to ground. A further problem is local discharges on soiled insulators, produced for example by increases in the electric field where there has been local drying.

To avoid local increases in the electric field, WO 2009/100904 A1 discloses providing at least certain portions of a composite insulator with a field control layer, which comprises field-influencing particles. Such particles have, for example, a resistive or capacitive effect or are semiconducting, and, as a result of a non-linear relationship between a corresponding electrical variable and the voltage, contribute to reducing sudden changes in voltage along the insulator. Mentioned in particular are microvaristors of ZnO, which above a threshold voltage display an abrupt reduction in the electrical resistance.

SUMMARY

Certain embodiments of the invention provide a composite insulator of the type mentioned at the beginning that is further improved with regard to the avoidance of local discharges.

In a composite insulator of the type mentioned at the beginning, the protective layer comprises specifically in certain portions particles that influence the field of the insulator.

In at least one embodiment, the invention is thereby based on the idea of placing the particles that influence the field along the insulator specifically at certain portions on the insulator in such a way that discharges that occur during the service life under the external conditions to be expected and could lead to instances in which the insulating protective layer is destroyed are avoided as far as possible. In this respect, investigations have been carried out on long-rod composite insulators designed for a voltage of 420 kV. With a number of sheds totalling 10, the long-rod composite insulators used had a creepage distance with a length of 3.91 m. The low number of sheds was deliberately chosen to achieve a greater breakdown tendency of the insulators in the test.

In a high-voltage laboratory, the insulators were exposed to artificial rainfall at an angle of 45° in accordance with the standard IEC 60060-1. The tests were carried out under alternating voltage. The artificial rain had a conductivity of $\kappa$=+/−100 μS/cm. The voltage applied was increased in stages. Resultant partial discharges were visually observed. Under a voltage of 600 kV, a conventionally produced long-rod composite insulator, the protective layer of which did not have any field-influencing particles, was observed to undergo as a result distinct discharges on the underside of the sheds toward the high-voltage end of the insulator.

On the basis of this finding, in at least one embodiment, the invention proceeds from the model concept that exposure of the insulators to rain causes a conductive coating to form on the upper side of the sheds and along the shank. As a consequence, a great voltage drop occurs across a conventional insulator over the dry underside of the sheds. If the dielectric strength of the surrounding atmosphere is exceeded due to the resultant local increase in the electric field, local discharges occur on the underside of the sheds.

In at least one embodiment, the invention therefore provides in a preferred configuration that the field-influencing particles are provided in the region of the aforementioned dry zones of the insulator, in particular on the undersides of sheds. For this purpose, the field-influencing particles are separately applied to certain portions, vulcanized on, applied with the protective layer, sprayed on, molded on or molded in. For this purpose, the field-influencing particles are expediently added to a suitable insulating material, in particular the material of the protective layer. Subsequently, this material of the existing protective layer is molded on, bonded on or vulcanized on. The field-influencing particles may also be admixed with the protective layer in certain portions during the production of the insulator. Alternatively, the material mixed with the field-influencing particles may also be overmolded in the protective layer during the final shaping of the insulator.

The protective layer and also the material mixed with the field-influencing particles is preferably a silicone rubber, an ethylene-propylene copolymer (EPDM), an ethylene-vinyl acetate (EVA) or an epoxy resin. Accordingly, a silicone rubber, EPDM, EVA or epoxy resin mixed with field-influencing particles is applied in certain portions.

Resistive or capacitive particles or semiconductor particles are preferably used as field-influencing particles. Microvaristors of doped zinc oxide (ZnO) are particularly preferred. Microvaristors of zinc oxide (ZnO) display a non-linear current-voltage characteristic. Up to a threshold voltage, zinc oxide may be regarded as a high-impedance resistance and has an extremely flat current-voltage characteristic. Above the threshold voltage, the resistance decreases abruptly; the current-voltage characteristic abruptly changes its steepness.

If such field-influencing particles, and in particular microvaristors, that is to say voltage-dependent resistors, are applied in certain portions to the insulator or with the protective layer, a local increase in the voltage or electric field is reduced as a result of the abruptly increased conductivity above the threshold voltage, so that the undesired local discharges leading to instances of destruction are prevented.

If the composite insulator comprises a number of sheds of the protective layer to extend the creepage distance, in a preferred configurational variant the field-influencing particles are comprised by the sheds or are arranged on the sheds. When the composite insulator is used in an upright position, the dry zones associated with great changes in voltage lie on the underside of the sheds. If the field-influencing particles are added to the protective layer of the sheds or arranged on the sheds, the discharges undesirably occurring there are avoided. In the case of this configurational variant, it has been found that not all of the sheds have to comprise the field-influencing particles. Rather, it is advantageous if only a partial number of the sheds are provided with the field-influencing particles. This is dependent on the variation in voltage over the length of the composite insulator. As investigations have shown, the greatest changes in voltage should clearly be expected at the sheds that are arranged at the voltage-carrying end.

In a preferred configuration, to this extent the partial number of sheds provided with field-influencing particles are located at the voltage-carrying end. Accordingly, starting from the voltage-carrying end of the composite insulator, initially a partial number of the sheds are provided with field-influencing particles. The sheds which then follow are produced conventionally without field-influencing particles.

Alternatively, starting from the voltage-carrying end of the composite insulator, initially a partial number of the sheds may be provided with field-influencing particles, and then a partial number of sheds produced conventionally, and this arrangement can be repeated over the length of the composite insulator.

It has also been found that the sheds as such do not have to be provided as a whole with the field-influencing particles. Rather, to reduce the voltage drop over the dry zone on the underside of the sheds, it is sufficient to provide only the underside of the sheds with field-influencing particles. This is sufficient to reduce the great changes in voltage between the ends of the sheds and the core or the shank of the insulator.

In a first configurational variant in this respect, the field-influencing particles are comprised by a separate disk, in particular of the material of the protective layer or of some other insulating material. After conventional production, known per se, of the sheds by encapsulation, molding, bonding on, shrinking on or vulcanizing on, the separate disk is vulcanized or bonded onto the underside of the sheds intended for it. Alternatively, the separately produced disk containing the field-influencing particles may be molded into the sheds during production. Finally, it is also possible to envelop the sheds provided with the separate disk on the underside in the protective layer in a concluding production process, in particular by encapsulation or overmolding.

According to another configuration of the invention, which can also be used in a combination, it is preferred for the protective layer as such with field-influencing particles to be applied on the underside of the intended sheds. For this purpose, the material of the protective layer is mixed with the field-influencing particles. Subsequently, the mixed material is sprayed, molded or vulcanized onto the underside of the sheds.

In a further preferred configuration, the sheds of the composite insulator are provided on the underside with ribs, which lead to a further lengthening of the creepage distance. The separate disk or the protective layer mixed with the field-influencing particles is preferably arranged on these ribs, as prescribed. On account of the increased surface area as a result of the ribs, improved bonding between the sheds and the separate disk or the subsequently applied protective layer mixed with field-influencing particles is achieved.

Furthermore, it has been found that, in particular in combination with sheds provided with field-influencing particles on the underside, a further improvement in the composite insulator with regard to the avoidance of local discharges is achieved if the protective layer is provided with the field-influencing particles at least in certain portions along the core. In particular, the core is provided with the protective layer that comprises the field-influencing particles for a partial portion in the vicinity of the voltage-carrying end of the composite insulator.

BRIEF DESCRIPTION OF THE DRAWINGS

In a further preferred configuration of the composite insulator, the sheds and/or the core are surrounded by an outer protective layer that is free from field-influencing particles. Such an outer protective layer allows account to be taken, if need be, of the specific external weathering effects to which the composite insulator is exposed during its use by choosing a separate material.

Exemplary embodiments of the invention are explained in more detail on the basis of a drawing, in which.

DETAILED DESCRIPTION

Figure 1:
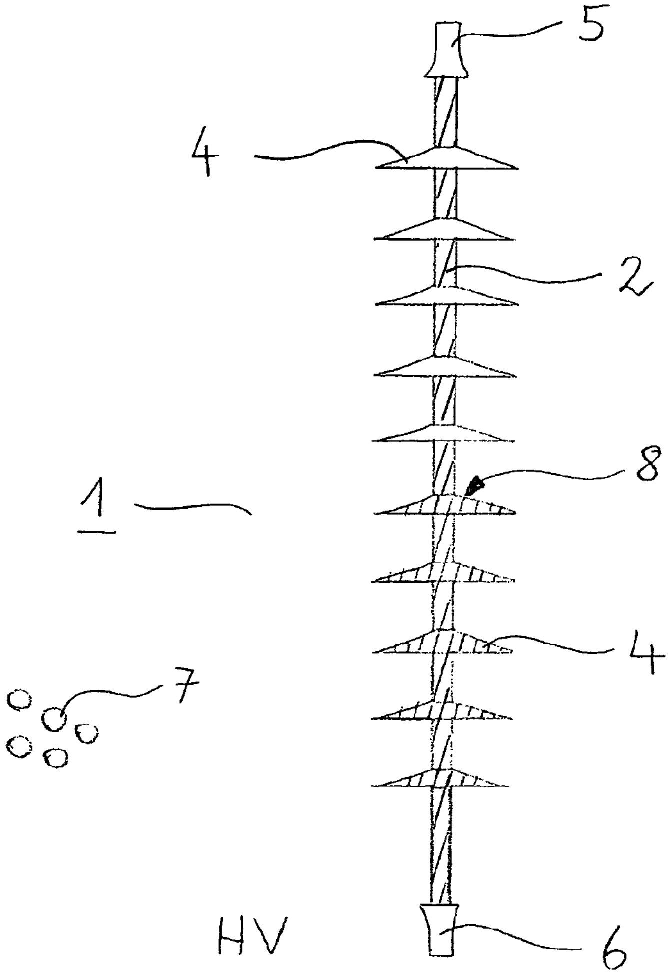
FIG. 1 shows a long-rod composite insulator according to a first configurational variant.

Represented in FIG. 1 is a long-rod composite insulator 1, which comprises a core 2 of a glass-fiber-reinforced plastic, on which ten sheds 4 are arranged, distributed over the length, to extend the creepage distance. Fastened to the ends of the core 2 are the connection fittings 5, 6. The connection fitting 6 is intended for the electrical contacting with a high voltage HV, and to this extent has the voltage-carrying end of the insulator 1.

The long-rod composite insulator 1 represented, with a total of ten sheds 4, is designed for the insulation of a voltage of approximately 400 kV. The core 2 is enveloped throughout in a protective layer 8 of a silicone rubber. Fastened on this envelope of the core 2 are the sheds 4. The sheds 4 are also produced from silicone rubber.

To avoid local discharges as a result of increases in the electric field or as a result of great changes in voltage, the protective layer 8 of the core 2 is mixed with field-influencing particles 7 over the entire length of the composite insulator 1. The field-influencing particles 7 are microvaristors of doped ZnO. Furthermore, at the voltage-carrying end of the composite insulator 1, that is to say adjoining the fitting 6, five of the total of ten sheds 4 are produced from silicone rubber mixed with field-influencing particles 7.

In a rain test, a long-rod composite insulator 1 corresponding to FIG. 1 displays a distinctly reduced discharging tendency on the underside of the sheds 4 as compared with a conventional long-rod composite insulator without field-influencing particles. The reason for this is that the microvaristors of ZnO become conductive under high voltages, so that the changes in voltage from the wetted upper side of the sheds 4 to the portion of the core 2 lying thereunder are reduced distinctly.

Figure 2:
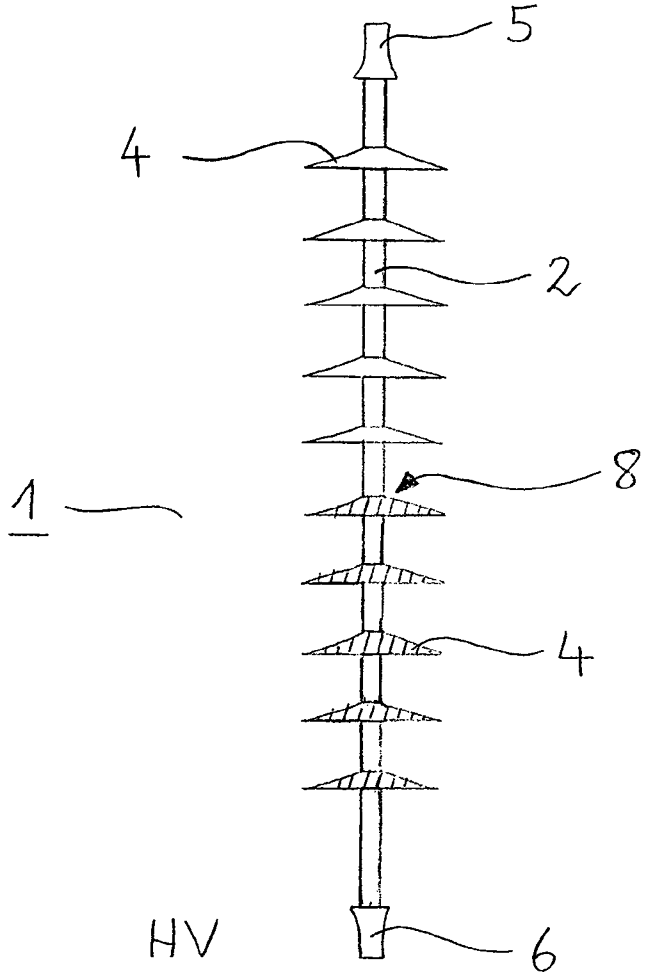
FIG. 2 shows a long-rod composite insulator according to a second configurational variant.

Represented in FIG. 2 is a long-rod composite insulator 1 that is similar in its basic construction to FIG. 1. It differs in that the protective layer 8 along the core 2 is now not provided with field-influencing particles 7. Rather, only the five sheds 5 adjacent the voltage-carrying end of the composite insulator 1 are produced from a protective layer 8 that is mixed with field-influencing particles.

In a rain test, this composite insulator 1 according to FIG. 2 also displays a distinctly reduced sparkover tendency on the underside of the sheds 4 as compared with a conventional long-rod composite insulator without field-influencing particles 7.

Figure 3:
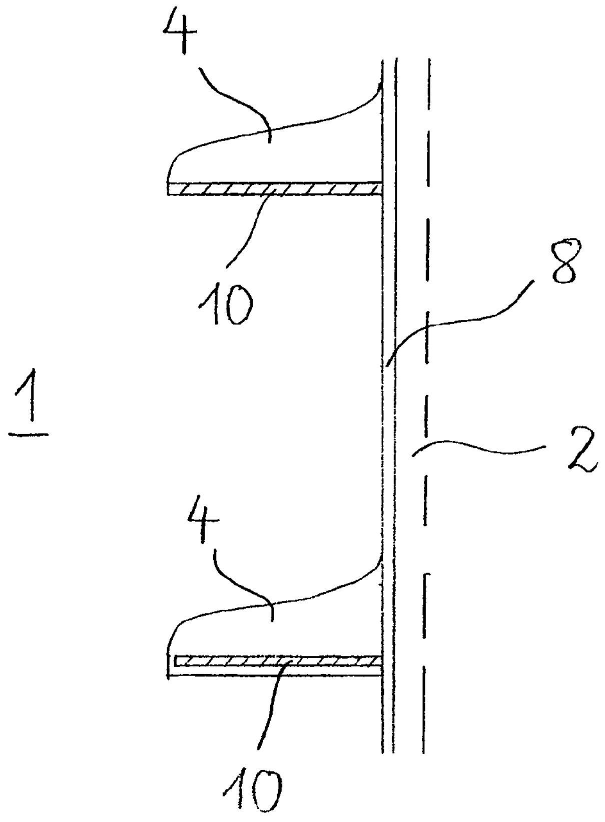
FIG. 3 shows a detail of a long-rod composite insulator, the sheds being provided on the underside with a disk containing field-influencing particles.

Represented in FIG. 3 is a partial detail of a long-rod composite insulator 1 corresponding to FIG. 1 or 2. In this case, two sheds 4 in the vicinity of the voltage-carrying end, that is to say in the vicinity of the fitting 6, are shown.

The long-rod composite insulator 1 corresponding to FIG. 3 comprises the core 2 of a glass-fiber-reinforced plastic. On the core 2, a protective layer 8 of silicone rubber is applied. Mounted on this protective layer 8 are the sheds 4.

To influence the electric field or to reduce great changes in voltage, a separate disk 10 of prefabricated EPM that contains field-influencing particles 7 is fastened on the underside of the sheds 4.

Corresponding to a first configurational variant, the separate disk 10 has correspondingly been vulcanized onto the underside of the upper shed 4. Corresponding to a second configurational variant, the separate disk 10, containing the field-influencing particles, is molded into the material of the shed 4, as can be seen from the lower shed 4.

Figure 4:
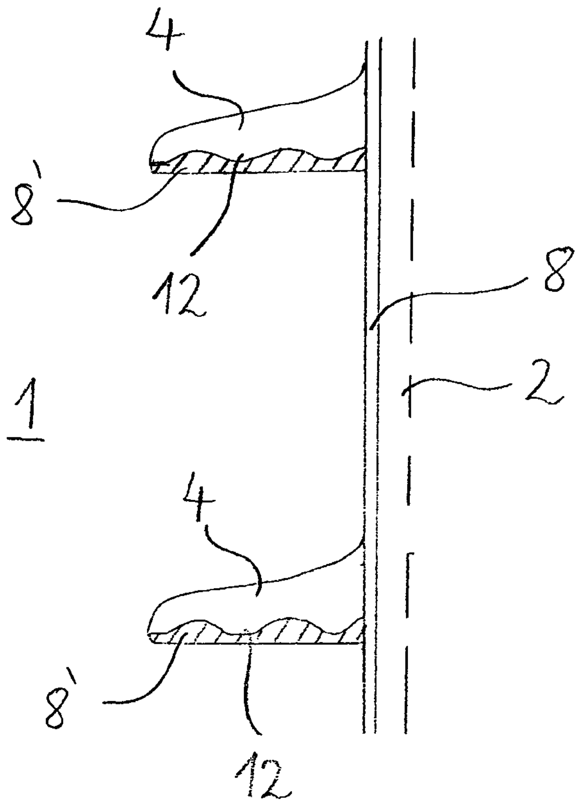
FIG. 4 shows a detail of a long-rod composite insulator, the sheds being provided on the underside with a protective layer that comprises field-influencing particles.
Figure 5:
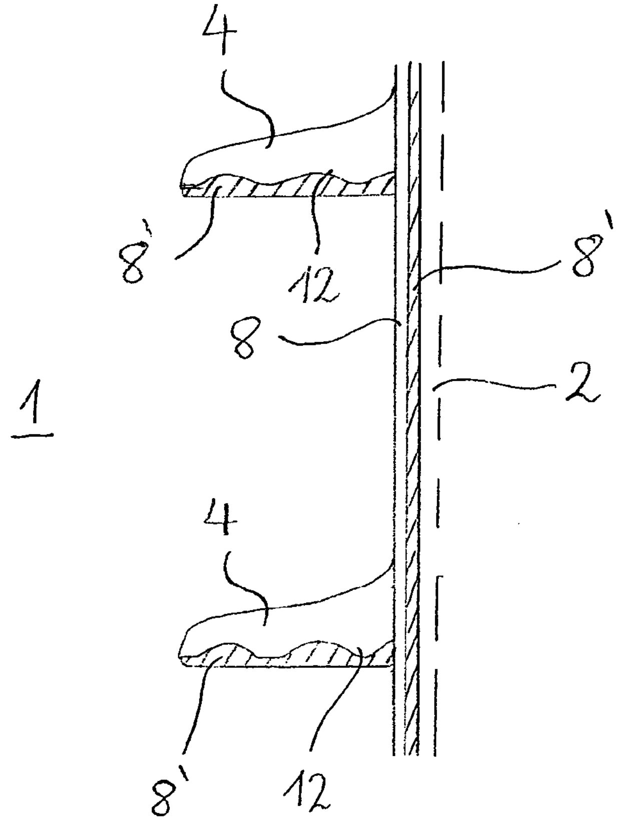
FIG. 5 shows a detail of a long-rod composite insulator, the core of which, as compared with the composite insulator that is shown in FIG. 4, is additionally provided with a protective layer that comprises field-influencing particles.

According to FIG. 4, the sheds 4 of another variant of the long-rod composite insulator 1 comprise a number of peripheral ribs 12 on the underside. A protective layer 8' that contains the field-influencing particles 7 is molded onto these ribs 12. According to FIG. 5, the long-rod composite insulator 1 has at least in certain portions on the core 2 a further surrounding protective layer 8', which in turn is mixed with field-influencing particles.

Figure 6:
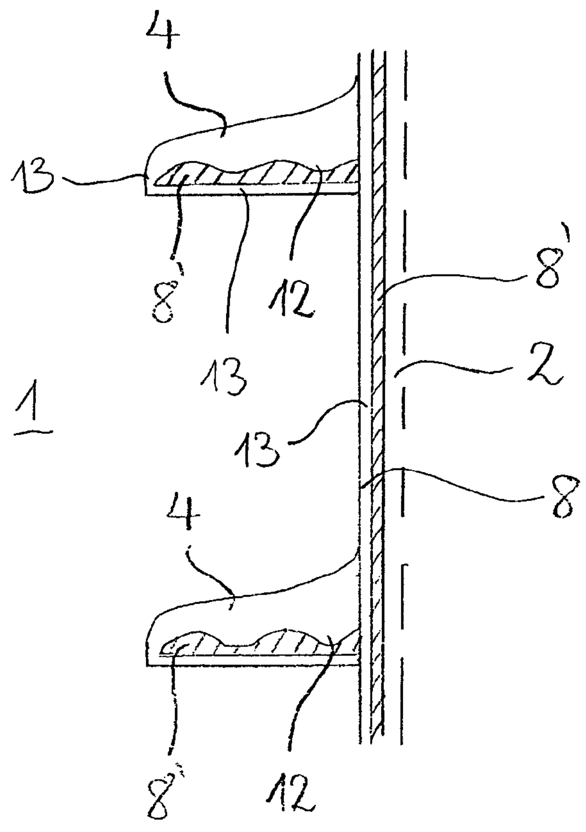
FIG. 6 shows a long-rod composite insulator according to FIG. 5, the sheds including the protective layer mixed with field-influencing particles being enveloped in an outer protective layer.

According to FIG. 6, the protective layer 8' with field-influencing particles that is provided on the underside of the sheds 4 is molded into the sheds 4. In addition, in particular according to a concluding production step, the long-rod composite insulator 1 shown in FIG. 6 is enveloped in an outer protective layer 13 of silicone rubber that does not comprise field-influencing particles 7.

DESIGNATIONS

1 composite insulator
2 core
4 shed
5 connection fitting
6 connection fitting
7 field-influencing particles
8 protective layer
8' protective layer with field-influencing particles
10 disk
12 ribs
13 outer protective layer
HV high-voltage end In at least some of the embodiments of FIGS. 1-6, a composite insulator comprises a core of a fiber-reinforced thermoset and a plurality of sheds positioned along the core to extend the creepage distance. A first subset of the sheds comprises field-influencing particles influencing the field of the insulator, and a second subset of the sheds does not comprise the field-influencing particles. The first subset are one or more sheds positioned along one end of the core, and the second subset are one or more sheds positioned along the other end of the core. At least one shed of the first subset of sheds comprises (i) field-influencing particles at an underside of the at least one shed and (ii) no field-influencing particles at an upper side of the at least one shed. In certain embodiments, each shed of the first subset of sheds comprises (i) field-influencing particles at an underside of the shed and (ii) no field-influencing particles at an upper side of the shed.

The invention claimed is:

1. A composite insulator comprising:
a core of a fiber-reinforced thermoset; and
a plurality of sheds positioned along the core to extend the creepage distance, wherein:
a first subset of the sheds comprises field-influencing particles influencing the field of the insulator;
a second subset of the sheds does not comprise the field-influencing particles;
the first subset are one or more sheds positioned along one end of the core;
the second subset are one or more sheds positioned along the other end of the core; and
at least one shed of the first subset of sheds comprises (i) field-influencing particles at an underside of the at least one shed and (ii) no field-influencing particles at an upper side of the at least one shed.

2. The composite insulator of claim 1, wherein the sheds are part of a protective layer surrounding the core.

3. The composite insulator of claim 1, further comprising:
a lower connection fitting connected to the bottom of the core; and
an upper connection fitting connected to the top of the core, wherein:
the first subset are one or more sheds positioned along the lower length of the core; and
the second subset are one or more sheds positioned along the upper length of the core.

4. The composite insulator of claim 1, wherein along the core is a layer that comprises field-influencing particles.

5. The composite insulator of claim 1, wherein along the core is a layer that does not comprise field-influencing particles.

6. The composite insulator of claim 1, wherein, for at least one shed of the first subset, the field-influencing particles are in a disk that is fastened onto an underside of the shed.

7. The composite insulator of claim 6, wherein the disk is vulcanized onto the underside of the shed.

8. The composite insulator of claim 6, wherein the disk is molded into the underside of the shed.

9. The composite insulator of claim 1, wherein:
at least one shed of the first subset has ribs on its underside; and
a layer having the field-influencing particles is molded onto the ribs.

10. The composite insulator of claim 1, further comprising an outer protective layer that does not comprise field-influencing particles.

11. The composite insulator of claim 1, wherein the first subset of the sheds are located at the voltage-carrying end (HV) of the insulator.

12. The composite insulator of claim 1, wherein the field-influencing particles are resistive or capacitive particles or semiconductor particles.

13. The composite insulator of claim 1, wherein:

the fiber-reinforced thermoset is a glass-fiber-reinforced plastic;

the sheds comprise silicone rubber; and the field-influencing particles comprise microvaristors of doped ZnO.

14. The composite insulator of claim 1, wherein each shed of the first subset of sheds comprises (i) field-influencing particles at an underside of the shed and (ii) no field-influencing particles at an upper side of the shed.

* * * * *